(12) United States Patent
Manda

(10) Patent No.: US 9,160,890 B2
(45) Date of Patent: Oct. 13, 2015

(54) METHOD AND APPARATUS FOR CONVERTING A COLOR FROM ONE COLOR SYSTEM TO ANOTHER COLOR SYSTEM

(71) Applicant: KYOCERA Document Solutions Inc., Osaka (JP)

(72) Inventor: Etsuko Manda, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/528,760

(22) Filed: Oct. 30, 2014

(65) Prior Publication Data

US 2015/0116739 A1    Apr. 30, 2015

(30) Foreign Application Priority Data

Oct. 30, 2013    (JP) ................................. 2013-226082

(51) Int. Cl.
*H04N 1/60* (2006.01)

(52) U.S. Cl.
CPC ........... *H04N 1/6002* (2013.01); *H04N 1/6005* (2013.01); *H04N 1/6008* (2013.01); *H04N 1/6075* (2013.01); *H04N 2201/0094* (2013.01)

(58) Field of Classification Search
CPC . H04N 1/6058; H04N 1/6002; H04N 1/6075; H04N 1/60; H04N 19/94; H04N 1/644; G06K 9/6231; G06K 9/6273

USPC ........... 358/1.9, 2.1, 518, 520, 523; 382/167; 345/600, 604
See application file for complete search history.

(56) References Cited

U.S. PATENT DOCUMENTS 6,292,195 B1    9/2001    Shimizu et al.
2010/0165364 A1*  7/2010   Qiao ...................... H04N 1/603
                                                    358/1.9

FOREIGN PATENT DOCUMENTS

JP    11-103397 A    4/1999

* cited by examiner

*Primary Examiner* — Jamares Q Washington
(74) *Attorney, Agent, or Firm* — McDonnell Boehnen Hulbert & Berghoff LLP

(57) ABSTRACT

A color conversion device includes: a hue acquisition unit that acquires a hue of a second target color having the same lightness and the same chroma as a first target color within Voronoi diagrams in which predefined colors defined in a color conversion table are set as generator points; a side group acquisition unit that acquires side groups that are two groups located on both sides of the first target color in terms of the hue, based on a hue of the first target color and the hue of the second target color; and a color conversion unit that acquires a third target color by converting the first target color from a color in a color system before conversion into a color in a color system after the conversion based on the predefined colors of the side groups acquired by the side group acquisition unit and the first target color.

12 Claims, 20 Drawing Sheets

METHOD AND APPARATUS FOR CONVERTING A COLOR FROM ONE COLOR SYSTEM TO ANOTHER COLOR SYSTEM

CROSS-REFERENCE TO RELATED APPLICATION

Priority is claimed to Japanese Patent Application No. 2013-226082, filed in the Japan Patent Office on Oct. 30, 2013, the entire contents of which are hereby incorporated by reference.

FIELD

The present disclosure relates to a color conversion device that converts a target color from a color in a first color system to a color in a second color system.

BACKGROUND

In a typical color conversion method for converting a target color from a color in a first color system before conversion into a color in a second color system, a predefined color around the target color may be selected from among a plurality of predefined colors distributed irregularly in a color conversion table. The color conversion table may define a correspondence or relationship between a plurality of colors in the first color system and a plurality of colors in the second color system. Based on the selected predefined color and the target color, the target color may be converted to a color in the second color system.

In a typical application of this color conversion method, the color conversion table may be divided into a first plurality of color spaces, which are then searched for a color space that includes the target color. That color space may then be divided further into a second plurality of color spaces searched for a color space that includes the target color. In this manner, such operations may be repeatedly performed to narrow down the predefined color around the target color.

SUMMARY

A color conversion device is disclosed. The color conversion device includes a hue acquisition unit, a side group acquisition unit, and a color conversion unit. The hue acquisition unit acquires a hue of a second target color having an approximately same lightness and an approximately same chroma as a first target color within one of a plurality of Voronoi diagrams. A set of generation points for each Voronoi diagram may correspond to a predefined color in a color conversion table. The color conversion table may define a correspondence or relationship between a color in a first color system and a color in a second color system. Additionally, the one or more Voronoi diagrams may correspond to a plurality of groups into which the predefined colors are classified according to ranges of a series of hues. The side group acquisition unit acquires two side groups, which are two groups in the plurality of groups located on either side of the first target color in terms of the hue. The side group acquisition unit acquires the side groups based on a hue of the first target color and the hue of the second target color. The color conversion unit acquires a third target color by converting the first target color from the color in the first color system to the color in the color system after the conversion based on the predefined colors corresponding to the side groups and the first target color.

A method is disclosed. The method includes acquiring, via a hue acquisition unit, a hue of a second target color having an approximately same lightness and an approximately same chroma as a first target color. The second target color is acquired from one of a plurality of Voronoi diagrams. A set of generation points for each Voronoi diagram may correspond to one of a plurality of predefined colors defined in a color conversion table. The color conversion table defines a correspondence or a relationship between colors in a first color system and colors in a second color system. Additionally, each Voronoi diagram corresponds to one of a plurality of groups into which the plurality of predefined colors is classified according to respective ranges of a series of hues. The method also includes acquiring, via a side group acquisition unit, side groups, which are two groups in the plurality of located on either side of the first target color in terms of hue. The side groups are acquired based on a hue of the first target color and the hue of the second target color. The method further includes acquiring, via a color conversion unit, a third target color by converting the first target color from the color in the first color system to a color in the second color system. The third target color is acquired based on the predefined colors corresponding to the side groups and the first target color.

A non-transitory computer-readable recording medium is disclosed. The non-transitory computer-readable medium includes instructions executable by a processor to perform functions. The functions include acquiring a hue of a second target color having an approximately same lightness and an approximately same chroma as a first target color. The second target color is acquired from one of a plurality of Voronoi diagrams. A set of generation points for each Voronoi diagram may correspond to one of a plurality of predefined colors defined in a color conversion table. The color conversion table defines a correspondence or a relationship between colors in a first color system and colors in a second color system. Additionally, each Voronoi diagram corresponds to one of a plurality of groups into which the plurality of predefined colors is classified according to respective ranges of a series of hues. The functions also include acquiring side groups, which are two groups in the plurality of groups located on either side of the first target color in terms of hue. The side groups are acquired based on a hue of the first target color and the hue of the second target color. The functions further include acquiring a third target color by converting the first target color to a color in the second color system based on the predefined colors corresponding to the side groups and the first target color.

Additional features and advantages are described herein, and will be apparent from the following detailed description and the figures.

BRIEF DESCRIPTION OF THE DRAWINGS

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Figure 1:
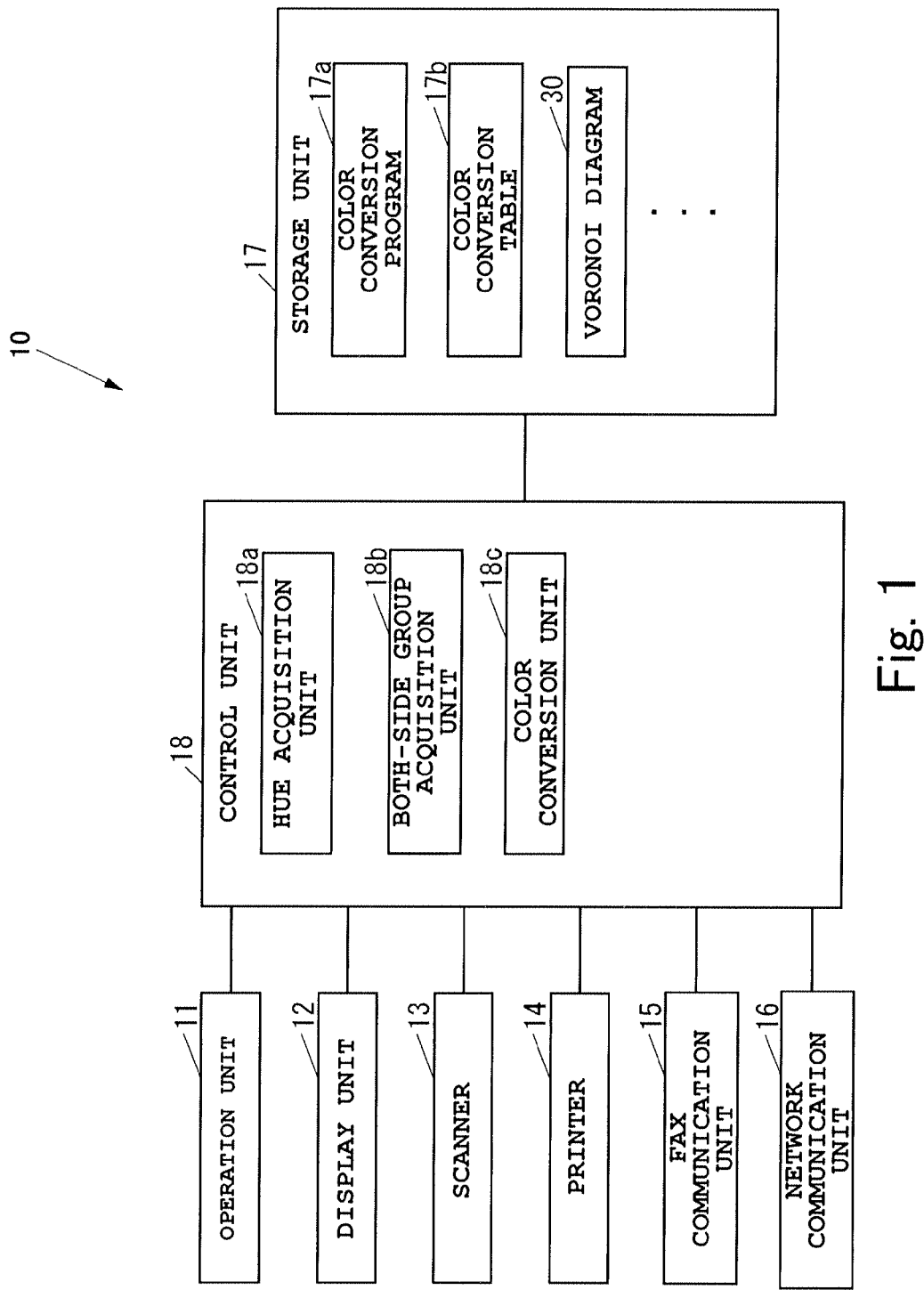
FIG. 1 illustrates a configuration of a multifunctional peripheral, according to an example.

FIG. 1 depicts a multifunction peripheral (MFP) 10 according to the embodiment. In one embodiment, the MFP 10 may be configured to serve as a color conversion device. As illustrated in FIG. 1, the MFP 10 includes an operation unit 11, a display unit 12, a scanner 13, a printer 14, a FAX communication unit 15, a network communication unit 16, a storage unit 17, and a control unit 18.

The operation unit 11 is an input device that includes buttons or the like through which a user inputs various operations.

The display unit 12 is a display device such as a liquid crystal display (LCD) that is configured to display various kinds of information.

The scanner 13 is a reading device that is configured to read an image of an original document, photograph, or the like.

The printer 14 is a device that executes printing on a recording medium such as paper.

The FAX communication unit 15 is a device that performs facsimile communications to/from an external facsimile apparatus (not shown) through a communication line, such as a public telephone line.

The network communication unit 16 is a device that is configured to communicate with an external device through a network, such as a local area network (LAN) and/or the Internet.

The storage unit 17 is a device such as an electrically erasable programmable read only memory (EEPROM) and a hard disk drive (HDD).

The control unit 18 controls the entire MFP 10.

The storage unit 17 may store a color conversion program 17a that is executable by the control unit 18. The color conversion program 17a may be installed or otherwise loaded into the storage unit 17 during manufacturing of the MFP 10. Alternatively, the conversion program 17a may be installed or loaded in the storage unit 17 from a storage medium, such as an SD memory card or a universal serial bus (USB) memory, or the conversion program 17a may be installed/loaded in the storage unit 17 from the network via network communication unit 16.

The storage unit 17 may also store a color conversion table 17b. The conversion table 17b may define a correspondence or a relationship between one or more colors in a first color system and one or more colors in a second color system. By way of example, the first color system may be a red-green-blue (RGB) color system, and the second color system may be a cyan-magenta-yellow-key (CMYK) color system.

Figure 2:
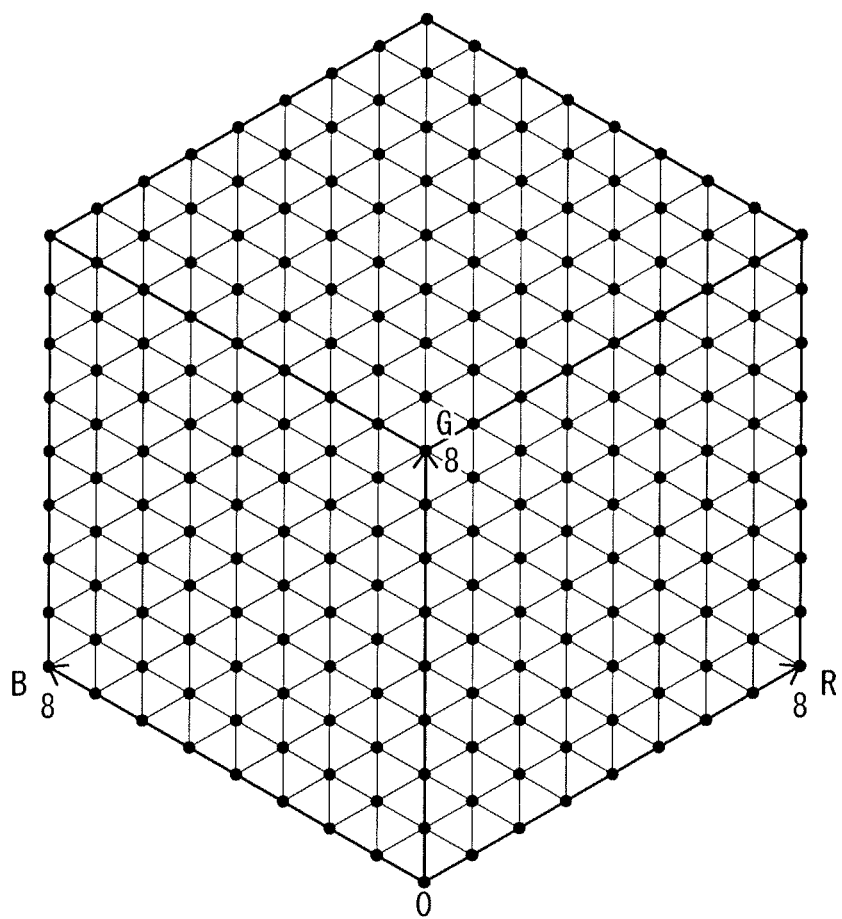
FIG. 2 shows an example of colors defined in a color conversion table described with respect to FIG. 1.

FIG. 2 shows an example of colors (hereinafter referred to as "predefined colors") in an RGB color system which may be defined in the color conversion table 17b.

As shown in FIG. 2, each predefined color in the color conversion table 17b may have an R-value indicating a brightness of red, a G-value indicating a brightness of green, and a B-value indicating a brightness of blue. Each such value may range from zero to eight at regular intervals. In one example, the color conversion table 17b may thus include 729 in total from 9×9×9 colors.

In this example, the RGB color system may be divided by a hue angle thereof into forty-eight at regular intervals. An entire range of hues thereof may thus be divided into forty-eight ranges of a series of hues. Any one of hue numbers 0 to is assigned to each of the forty-eight ranges in order to avoid an overlap in a hue number with another range of hues. Specifically, the hue number 0 is assigned to the range of cyan hues, and the hue numbers up to 47 are assigned likewise in the following order: cyan-blue-magenta-red-yellow-green-cyan.

As illustrated in FIG. 1, the storage unit 17 may store one or more Voronoi diagrams 30. To this end, each predefined color in the color conversion table 17b may be associated with LCh color system coordinates, and each predefined color may thus be used as generation points for one or more of the Voronoi diagrams 30. Further, the Voronoi diagrams 30 may include a Voronoi diagram for each of the forty-eight groups into which the predefined colors are classified. In other words, the Voronoi diagram 30 is provided to each of the forty-eight ranges of hues.

A Voronoi diagram is a diagram obtained by dividing a given space by one or more hyperplanes, such as lines or planes, so as to obtain a plurality of spaces. Each space may include a set of points, each of which is close to one of the generator points existing in that space. The Voronoi diagram can thus be defined as a set of Voronoi regions $\{V(p_1), V(p_2), \ldots, V(p_n)\}$ corresponding to a finite part set $P=\{p_1, p_2, \ldots p_n\}$ within a metric space. Here, the Voronoi region represents a region $V(p_i)$ formed based on Equation 1 relative to a distance function d. Note that, in Equation 1, $d(p, p_i)$ represents a distance between a point p and a point $p_i$, and $d(p, p_j)$ represents a distance between the point p and a point $p_j$.

$$V(p_i)=\{p|d(p,p_i) \leq d(p,p_j), i \neq j\} \quad (1)$$

Figure 3:
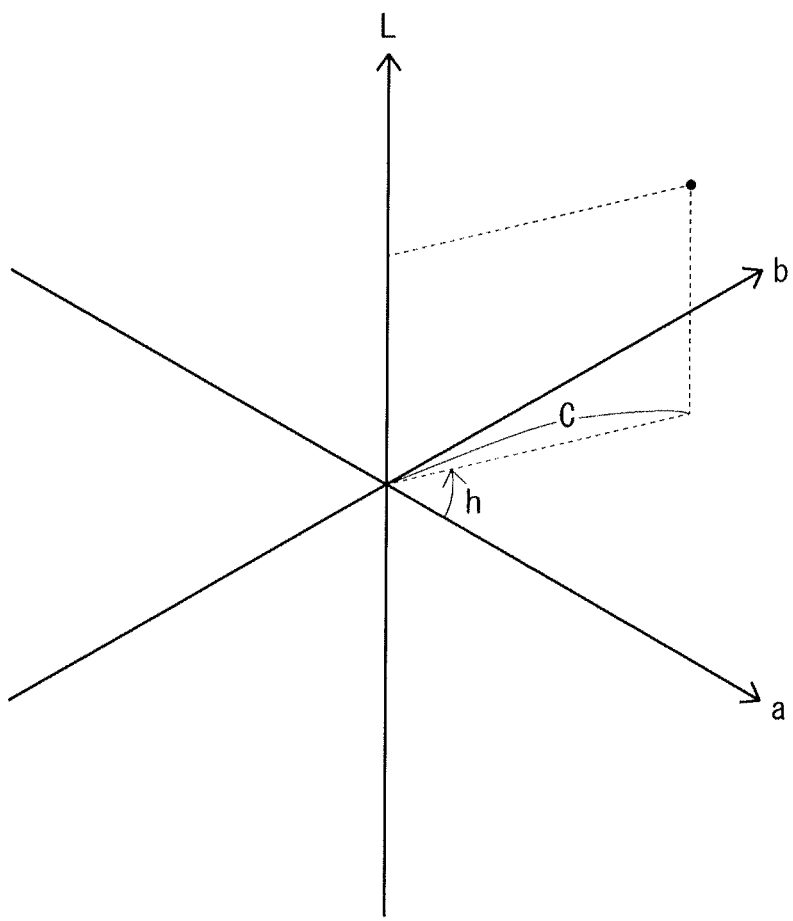
FIG. 3 shows a space in which an example Voronoi diagram described with respect to FIG. 1 is located.

FIG. 3 shows a space in which an example Voronoi diagram is located.

The space shown in FIG. 3 is based on a Lab color system. Thus, an L-axis indicates a lightness (i.e., an L-value of a color), an a-axis indicates a-value in a Lab color system, and a b-axis representing an axis of a b-value in the Lab color system. The L-axis, the a-axis, and the b-axis are perpendicular to one another.

The Voronoi diagram 30 can also be expressed in an LCh color system, with the L-value, the c-value, and the h-value serving as cylindrical coordinates. Here, the L-value indicates the lightness, a C-value indicates a chroma expressed by a distance from the L-axis, and an h-value indicates a hue expressed by an angle to a positive part of the a-axis.

Figure 4A:
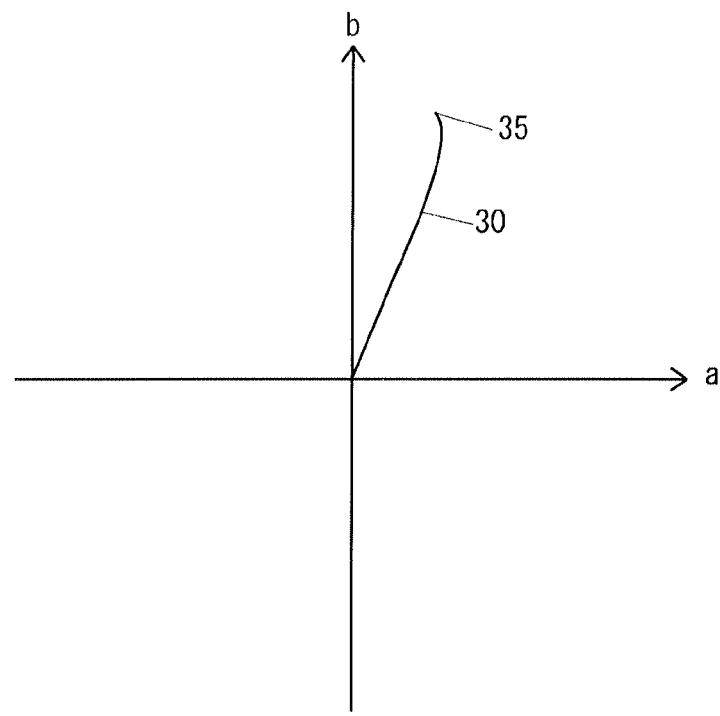
FIG. 4A shows an example of a Voronoi diagram in an a-b plane.
Figure 4B:
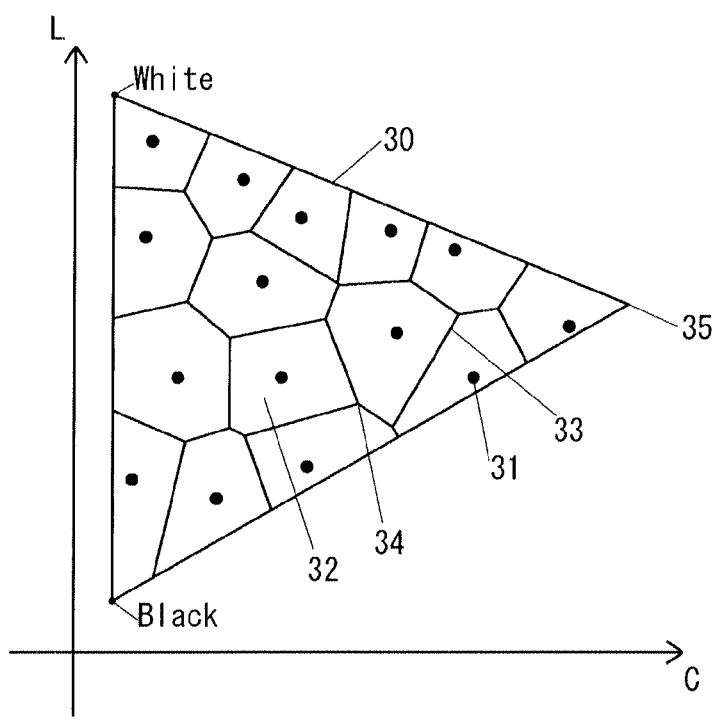
FIG. 4B shows the example Voronoi diagram in a C-L plane.

FIG. 4A shows the Voronoi diagram 30 described with respect to FIG. 3 in the a-b plane, while FIG. 4B shows the Voronoi diagram 30 in a C-L plane.

As discussed above, a set of the predefined colors included in the color conversion table 17b are generation points for Voronoi diagram 30. Voronoi regions 32 each include a generation point 31 and are separated from one another by a Voronoi edge 33. An intersection point of Voronoi edges 33 is referred to as Voronoi vertex 34. In the Voronoi diagram 30, a point 35 having the maximum C-value is referred to as "peak."

Returning to FIG. 1, the control unit 18 includes, for example, a central processing unit (CPU), a read only memory (ROM) that stores a program and different kinds of data, and a random access memory (RAM) used as a work area for the CPU. The CPU may execute programs stored in the ROM and/or the storage unit 17.

In one example, the control unit 18 may execute the color conversion program 17a stored in the storage unit 17. In this example, the control unit 18 may include a hue acquisition unit 18a, a side group acquisition unit 18b, and a color conversion unit 18c.

The hue acquisition unit 18a may acquire a hue of a second target color (hereinafter referred to as "second target color hue") in one of the Voronoi diagrams 30 that has an approximately same lightness and an approximately same chroma as a first target color.

The side group acquisition unit 18b may execute a portion of the color conversion program 17a to acquire side groups. The side groups are two groups in the plurality of groups located on either side of the first target color in terms of the hue. The side group acquisition unit may acquire the side groups based on a hue of the first target color and the second target color hue acquired by the hue acquisition unit 18a.

The color conversion unit 18c may execute a portion of the color conversion program 17a to convert the first target color to a color in the second color system based on the predefined colors corresponding to the side groups and the first target color.

Next, a description of an example operation of the MFP 10 is provided.

Figure 5:
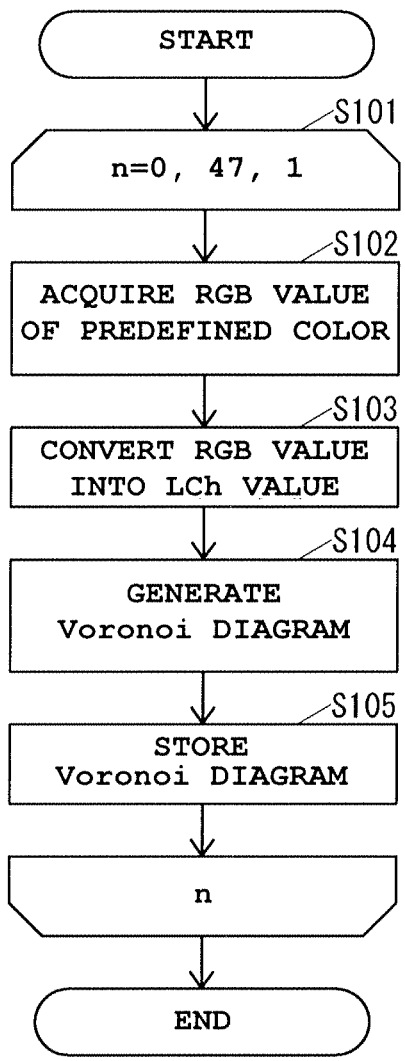
FIG. 5 is an example method for generating one or more Voronoi diagrams.

FIG. 5 illustrates steps of an example method the MFP 10 may perform to generate the one or more Voronoi diagram 30. To this end, the control unit 18 may execute a portion of the color conversion program 17a depicted in FIG. 5 in response to a specific event, such as when the color conversion program 17a is executed for the first time, when the color conversion table 17b is changed, and/or when a specific operation is input through the operation unit 11.

At step S101, the control unit 18 sets a variable n to an initial value "0", and then repeatedly performs the processes described with respect to Step S102 trough Step S105, incrementing the value of n by "1" until the variable n exceeds a final value "47."

At step 102, the control unit 18 acquires an RGB value (i.e., the first color system) of the predefined color having the same hue number as the value of the variable n (hereinafter referred to as "hue number n") from the color conversion table 17b.

Subsequently, the control unit 18 converts the RGB value acquired in Step S102 to an LCh value in step S103. For example, the control unit 18 may convert the RGB value to an XYZ value, convert the XYZ value to a Lab value, and then convert the Lab value to the LCh value.

At Step 104, the control unit 18 generates a Voronoi diagram in which the LCh value generated in Step S103 is set as the generation, and then stores the generated Voronoi diagram as the Voronoi diagram 30 of the hue number n (hereinafter referred to as "Voronoi diagram 30n") in the storage unit 17 at step S105.

When the process of repetition in Step S101 is finished, the control unit 18 finishes the operation illustrated in FIG. 5.

Next, a description is made of the operation of the MFP 10 performed when an image is output by converting RGB-value image data into CMYK-value image data.

Figure 6:
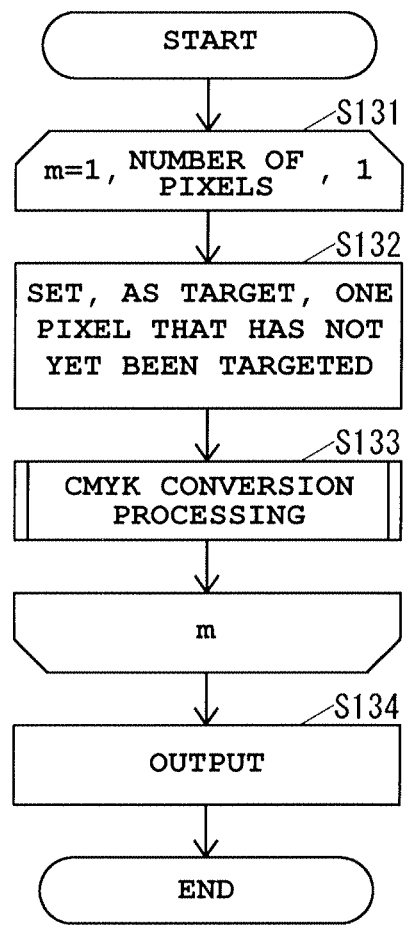
FIG. 6 is an example method for outputting an image.

When instructed to output an image based on the RGB-value image data, the control unit 18 of the MFP 10 executes the color conversion program 17a to operate as illustrated in FIG. 6. Note that, for example, the RGB-value image data can be input by reading an image from an original by the scanner 13, can be input by FAX-receiving an image by the FAX communication unit 15, or can be input by receiving print data by the network communication unit 16.

FIG. 6 illustrates the operation of the MFP 10 performed when the image is output by converting image data in a first color system to image data in a second color system. By way of example, the first color system is the RGB color system, and the second color system is the CMYK system.

Beginning at step S131, the color conversion unit 18c sets a variable m to an initial value "1", and then repeatedly performs execution of the processes of Step S132 and Step S133, incrementing the variable m by "1" until the variable m exceeds a final value indicating "the number of pixels of the image data."

Figure 7:
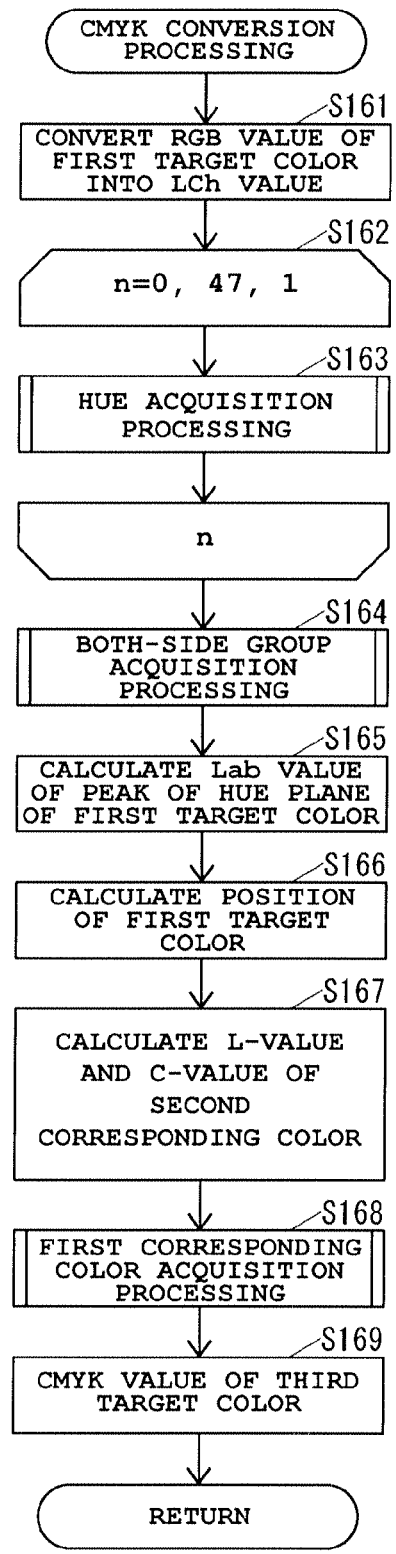
FIG. 7 is an example method for converting a color from a first color system to a color in a second color system.

Now at step S132, the color conversion unit 18c sets, as a target, one pixel that has not yet been targeted from the input image data, and then executes a CMYK conversion process, which is shown in FIG. 7

As illustrated in FIG. 7, the color conversion unit 18c converts the color of the pixel set as the target (i.e., the first target color), from an RGB value to an LCh value at step S161. As one example, the color conversion unit 18c may convert the RGB value of the first target color to an XYZ value, convert that XYZ value to a Lab value, and convert that Lab value to the LCh value.

When the process of Step S161 is finished, the hue acquisition unit 18a may set the variable n to the initial value at step S162. The hue acquisition unit 18a may then iteratively perform the process of Step S163, incrementing the value of the variable n by "1" until the variable n exceeds the final value "47".

Figure 8:
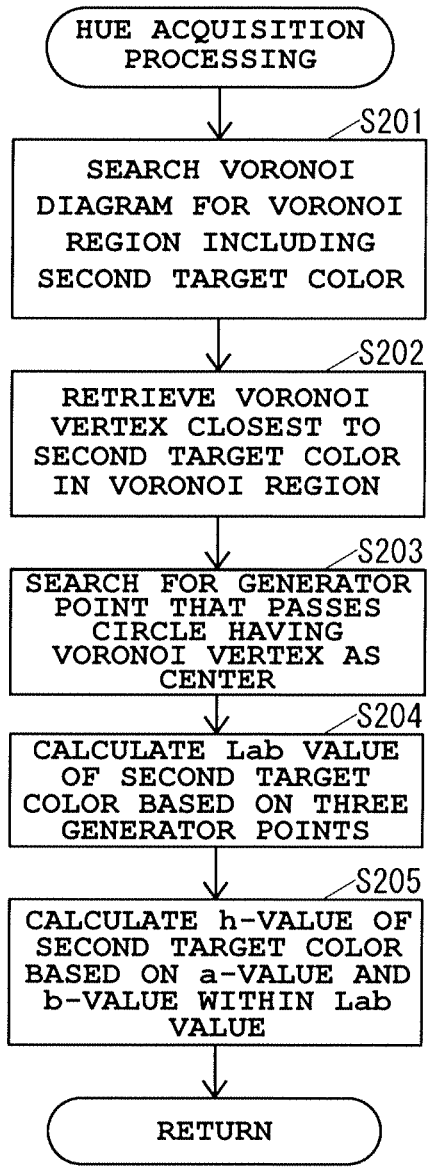
FIG. 8 is an example method for acquiring a hue of color.

Step S163 includes a hue acquisition process, which is described in more detail with respect to FIG. 8. The hue acquisition unit 18a may perform the steps of the method shown in FIG. 8 to acquire the hue of the second target color, which is a color having an L-value and a C-value that matches those of the first target color. That is, the hue acquisition unit may determine the second target color hue.

Turning then to FIG. 8, the hue acquisition unit 18a searches a Voronoi diagram 30n for a Voronoi region that includes a second target color: a color that has L-value and C-value the same as the L-value and the C-value of the first target color.

In the description of FIG. 8, reference is made to FIGS. 9-12, each of which shows an example of Voronoi diagram viewed in the C-L plane.

Figure 9:
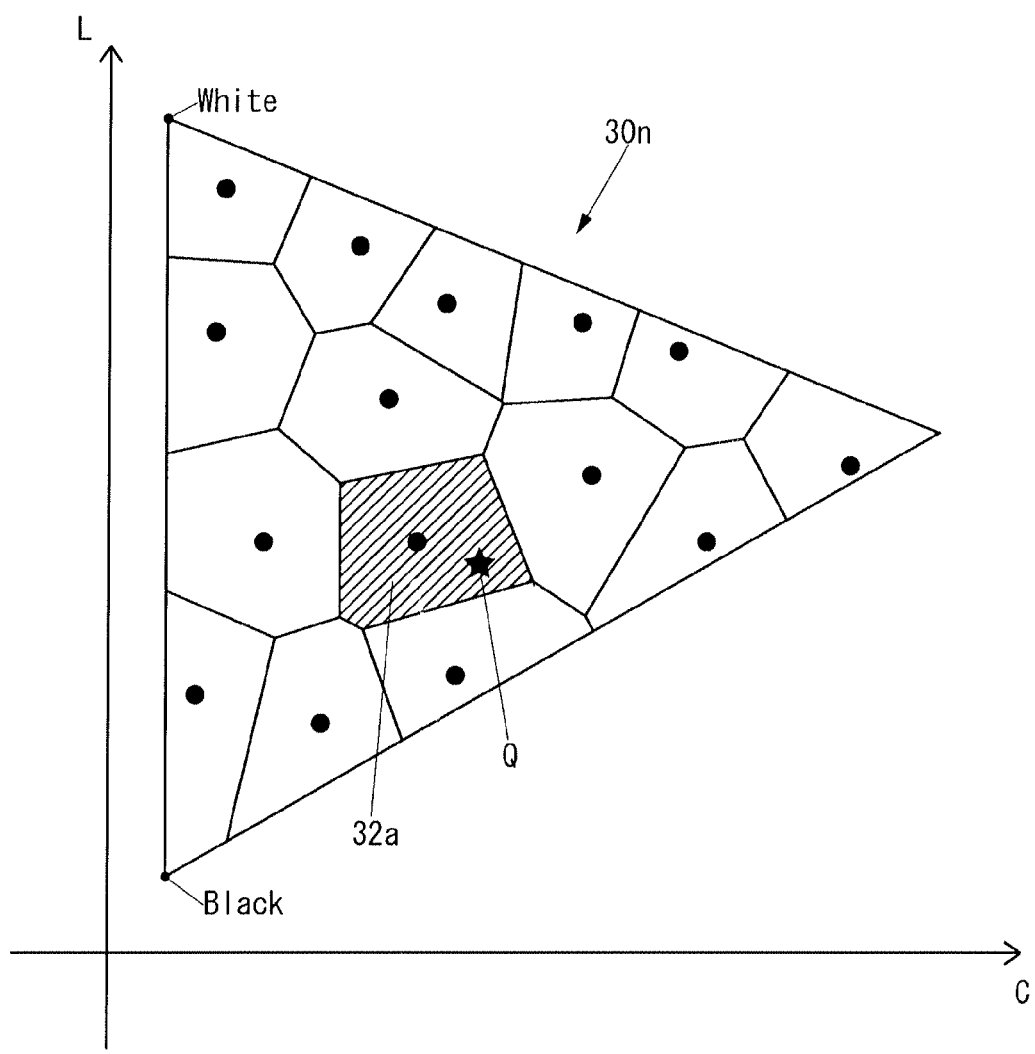
FIG. 9 shows an example Voronoi diagram that may be retrieved when performing steps of the example method described with respect to FIG. 8.

At step S201, the hue acquisition unit 18a searches each of the one or more Voronoi diagrams 30 for a Voronoi region that includes the second target. In FIG. 9, a point Q' (indicated by a star) in a Voronoi region 32a is a point corresponding to the second target color within the Voronoi diagram 30n.

Figure 10:
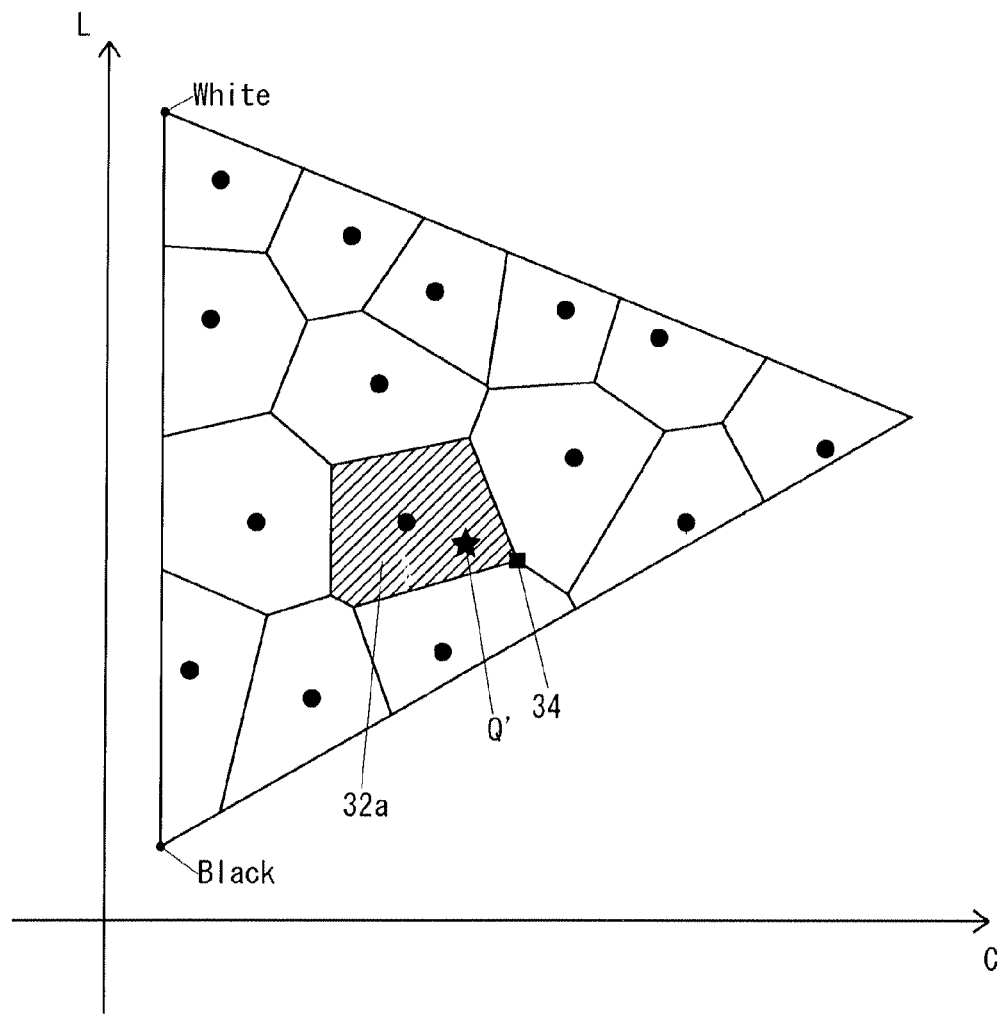
FIG. 10 shows an example Voronoi diagram in which a Voronoi vertex has been retrieved when performing steps of the example method described with respect to FIG. 8.

When the process of Step S201 is finished, the hue acquisition unit 18a continues to step S202 and retrieves values for a Voronoi vertex 34 that is closest to the second target color Q' in the Voronoi region 32a, as shown in FIG. 10.

Figure 11:
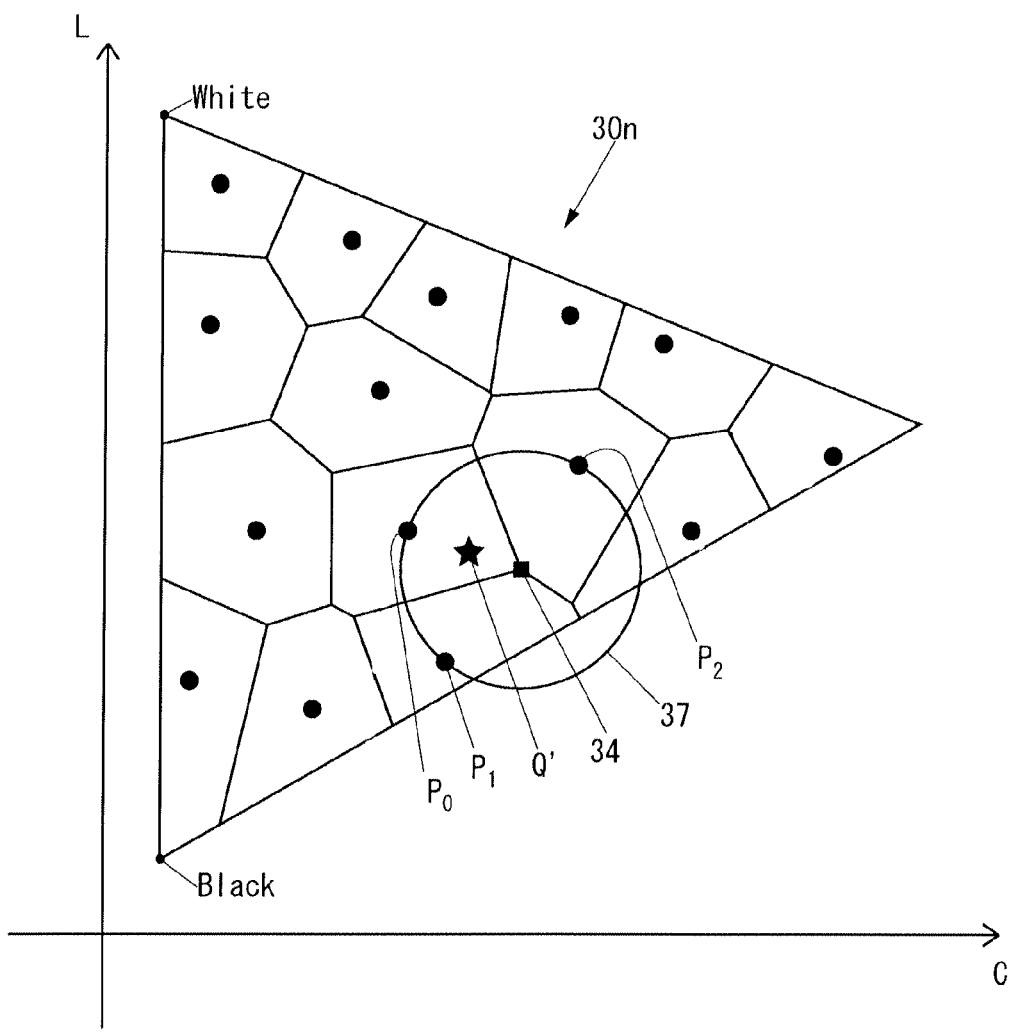
FIG. 11 shows an example Voronoi diagram in which a generation point has been retrieved when performing steps of the example method described with respect to FIG. 8.

At step S203, the hue acquisition unit 18a searches for the generation point(s) around a perimeter of circle 37 centered at the Voronoi vertex 34, as depicted in FIG. 11. It should be noted that there are generation points within the perimeter of the circle 37. In this case, a characteristic of the Voronoi diagram 30n is that a Voronoi vertex 34 exists in a position in which a plurality of generator points adjacent to one another are spaced apart by the same distance. Thus, generation points $P_0$, $P_1$, and $P_2$ are located on the perimeter of the circle 37.

When the process of Step S203 is finished, the hue acquisition unit 18a then determines the Lab value of the second target color based on the three generator points $P_0$, $P_1$, and $P_2$ using area interpolation, as expressed by Equation 2, at step S204.

$$LabQ'(n) = \frac{LabP_0(n) \times S\Delta Q'P_1P_2(n) + LabP_1(n) \times S\Delta Q'P_0P_2(n) + LabP_2(n) \times S\Delta Q'P_0P_1(n)}{S\Delta Q'P_1P_2(n) + S\Delta Q'P_0P_2(n) + S\Delta Q'P_0P_1(n)} \quad (2)$$

Figure 12:
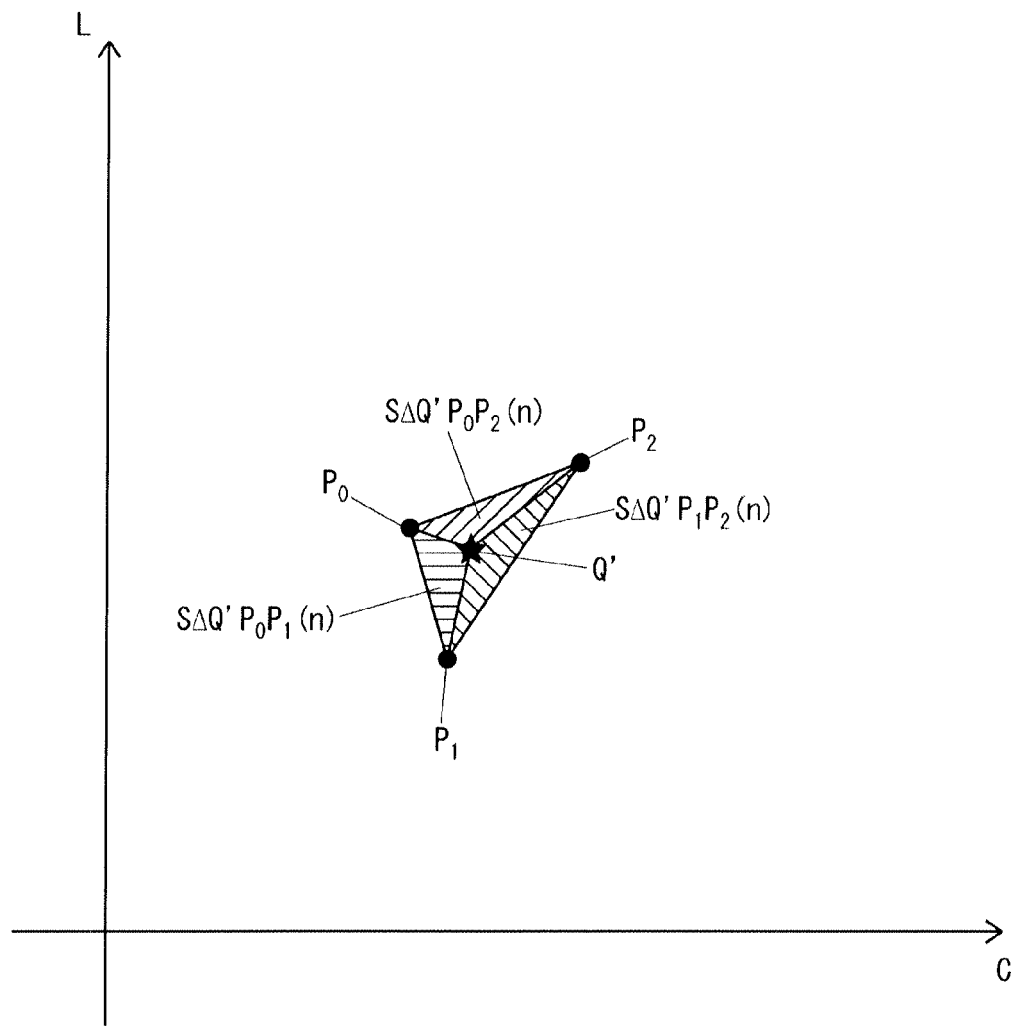
FIG. 12 shows an example of area interpolation performed on a Voronoi diagram when performing steps of the example method described with respect to FIG. 8.

In Equation 2, LabQ'(n) represents the Lab value of the second target color within the Voronoi diagram 30n, and $LabP_0$(n), $LabP_1$(n), and $LabP_2$(n) represent the Lab values of the generator points $P_0$, $P_1$, and $P_2$. As shown in FIG. 12, $S\Delta Q'P_1P_2$(n) represents an area of a triangle formed by the point Q', a generator point $P_1$, and a generator point $P_2$; $S\Delta Q'P_0P_2$(n) represents an area of a triangle formed by the point Q', the generator point $P_0$, and the generator point $P_2$; and $S\Delta Q'P_0P_1$(n) represents an area of a triangle formed by the point Q', the generator point $P_0$, and the generator point $P_1$.

$S\Delta Q'P_1P_2$(n), $S\Delta Q'P_0P_2$(n), and $S\Delta Q'P_0P_1$(n) can also be determined using an outer product of vectors. For example, $S\Delta Q'P_1P_2$(n) may be ½ of an absolute value of the outer product of a vector having the point Q' as a start point and the generator point $P_1$ as an end point and a vector having the point Q' as a start point and the generator point $P_2$ as an end point.

Note that in order to obtain LabQ'(n) in Equation 2, $S\Delta Q'P_1P_2$(n), $S\Delta Q'P_0P_2$(n), and $S\Delta Q'P_0P_1$(n) may have a clear ratio thereamong even if the respective values thereof are not accurate. The ratio among $S\Delta Q'P_1P_2$(n), $S\Delta Q'P_0P_2$(n), and $S\Delta Q'P_0P_1$(n) can be determined by using an outer product of vectors based on the L-value and the C-value of each of the point Q' and the generation points $P_0$, $P_1$, and $P_2$. Therefore, the hue acquisition unit 18a can also calculate the Lab value of the second target color within the Voronoi diagram 30n based on the Lab values and/or the L-values and the C-values of each of the point Q' and the generation points $P_0$, $P_1$, and $P_2$.

When the process of Step S204 is finished, the hue acquisition unit 18a then proceeds to step S205 and determines the second target color hue by determining an h-value of the second target color within the Voronoi diagram 30n. To this end, the hue acquisition unit 18a may use Equation 3 to determine the second target color hue, which is based on the a-value and the b-value of the Lab value of the second target color.

$$LChQ'(n, h) = \tan^{-1}\left(\frac{LabQ'(n, b)}{LabQ'(n, a)}\right) \quad (3)$$

In Equation 3, LChQ'(n,h) represents the h-value of the second target color within the Voronoi diagram 30n. LabQ'(n,a) represents the a-value within LabQ'(n). LabQ'(n,b) represents the b-value within LabQ'(n).

When the process of Step S205 is finished, the hue acquisition unit 18a finishes the hue acquisition process of FIG. 8.

Figure 13:
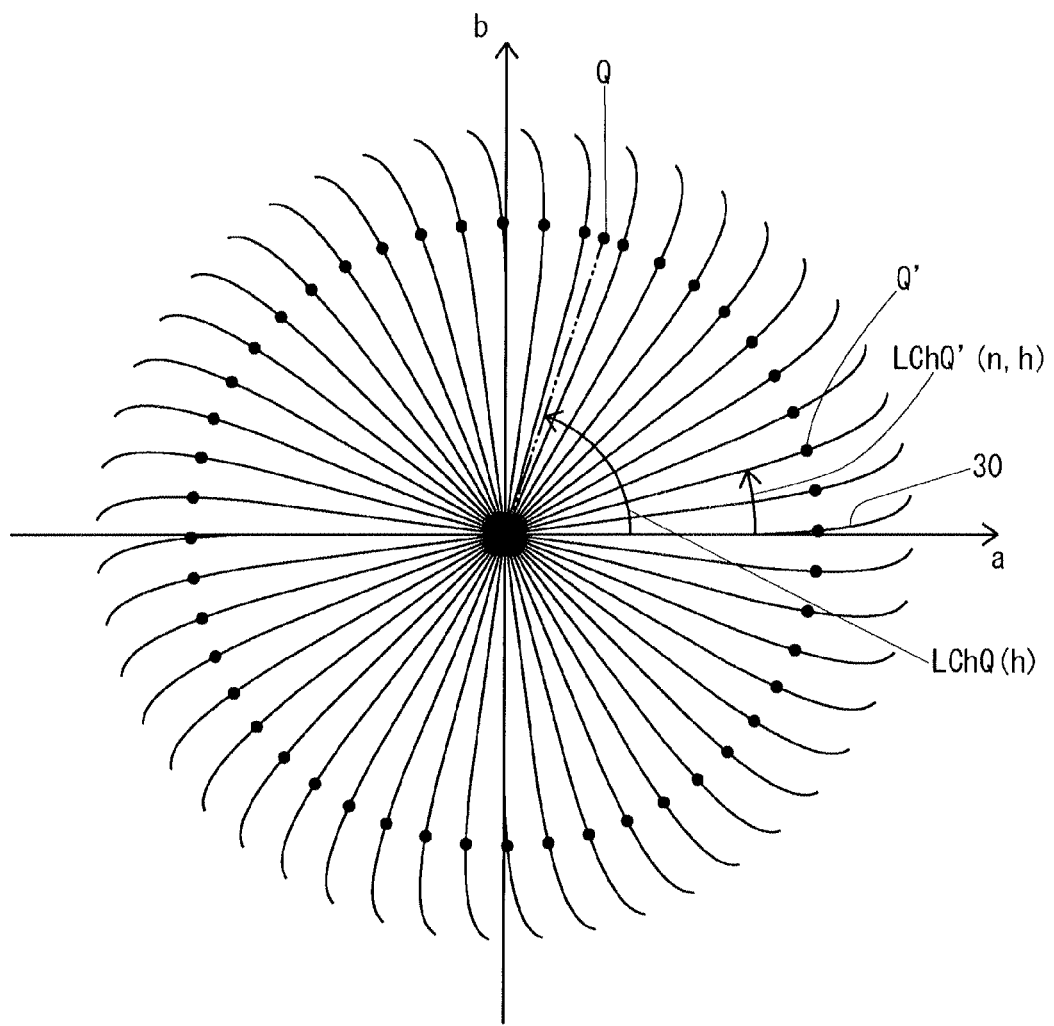
FIG. 13 shows an example Voronoi diagram in which side groups have been acquired when performing steps of the example method described with respect to FIG. 7.

Returning to FIG. 7, when the process of repetition in Step S162 is finished, the side group acquisition unit 18b of the control unit 18 executes a side group acquisition process at step S164. FIG. 13 shows an example graph of a plurality of side groups acquired in the side group acquisition process, with the graph showing a view in an a-b plane. A point Q represents a point indicating the first target color, and a point Q' represents an identified second target color for each of the one or more Voronoi diagrams 30, with each Voronoi diagram and each second target color corresponding to a specific hue number.

Figure 14:
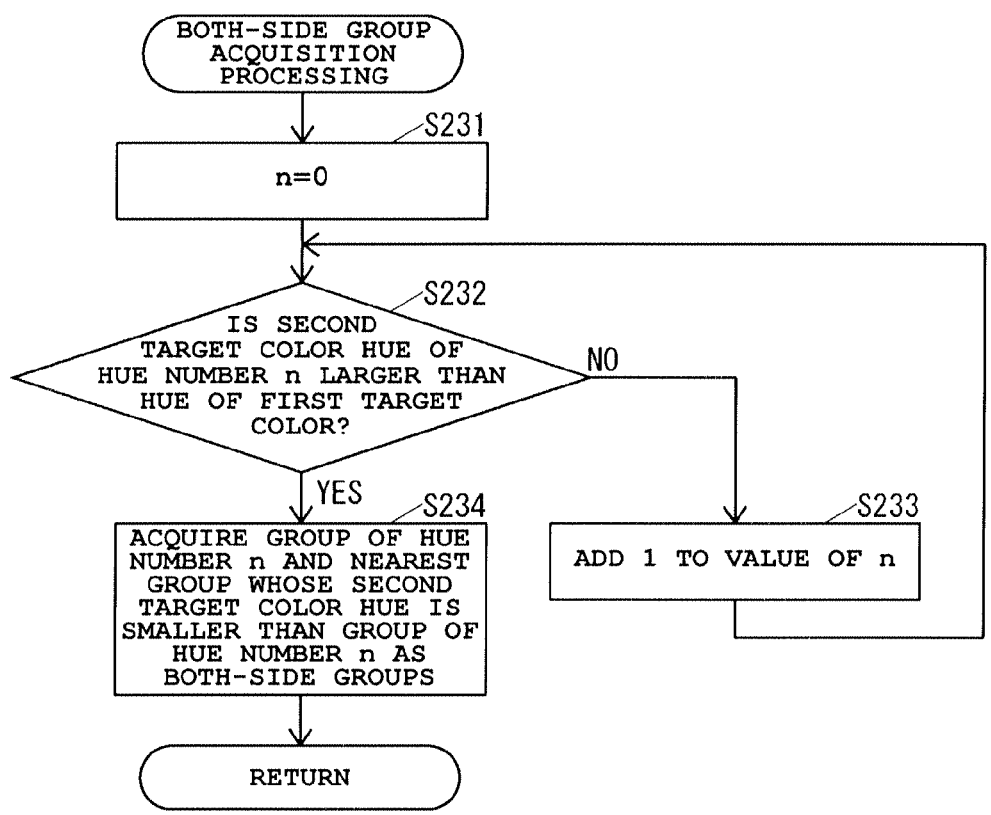
FIG. 14 is an example method for side groups when performing steps of the example method described with respect to FIG. 7.

When performing step S164, the side group acquisition unit 18b may perform a method described with respect to FIG. 14. The method shown in FIG. 14 is executable by the side group acquisition unit 18b to acquire two side groups, e.g., the two groups in the plurality of groups that are located on either side of the first target color in terms of the hue. FIG. 14 illustrates steps of the side group acquisition processing illustrated in FIG. 7.

At step S231, the side group acquisition unit 18b sets the variable n to the initial value "0". Moving to step S232, the side group acquisition unit 18b determines whether or not the second target color hue of hue number n is larger than the hue of the first target color, perhaps by determining whether or not the condition expressed in Equation 4 is established.

$$LChQ'(n,h) > LChQ(h) \quad (4)$$

In Equation 4, LChQ'(n,h) represents the second target color hue corresponding to the hue number n, and LChQ(h) represents the hue of the first target color, e.g., the h-value of the first target color.

When determining in Step S232 that LChQ'(n,h) is less than or equal to LChQ(h), the side group acquisition unit 18b adds 1 to the value of the variable n at step S233, and returns to Step S232.

When determining in Step S232 that LChQ'(n,h) is larger than LChQ(h), the side group acquisition unit 18b acquires the group of the hue number n and the nearest group whose second target color hue is smaller than the group of the hue number n as the side groups (S234), at which point the side group acquisition unit 18b completes the method shown in FIG. 14.

For illustrative purposes, the hue number of the side group having the smaller second target color hue is referred to as $n_1$, and the hue number of the other side group is referred to as $n_2$. Here, $n_2$ is larger than $n_1$ by 1 when $n_1$ is not "47", and is "0" when $n_1$ is "47".

Returning again to FIG. 7, now at Step S165, the color conversion unit 18c determines a Lab value of a peak of an iso-hue plane of the first target color 40 (hereinafter referred to as "hue plane") based on the Lab values of the peaks of iso-hue planes 51 and 52 of the second target color hues of the side groups $n_1$ and $n_2$, respectively (hereinafter referred to as "side hue planes"). Here, a peak represents a point at which a C-value is maximum.

Figure 15:
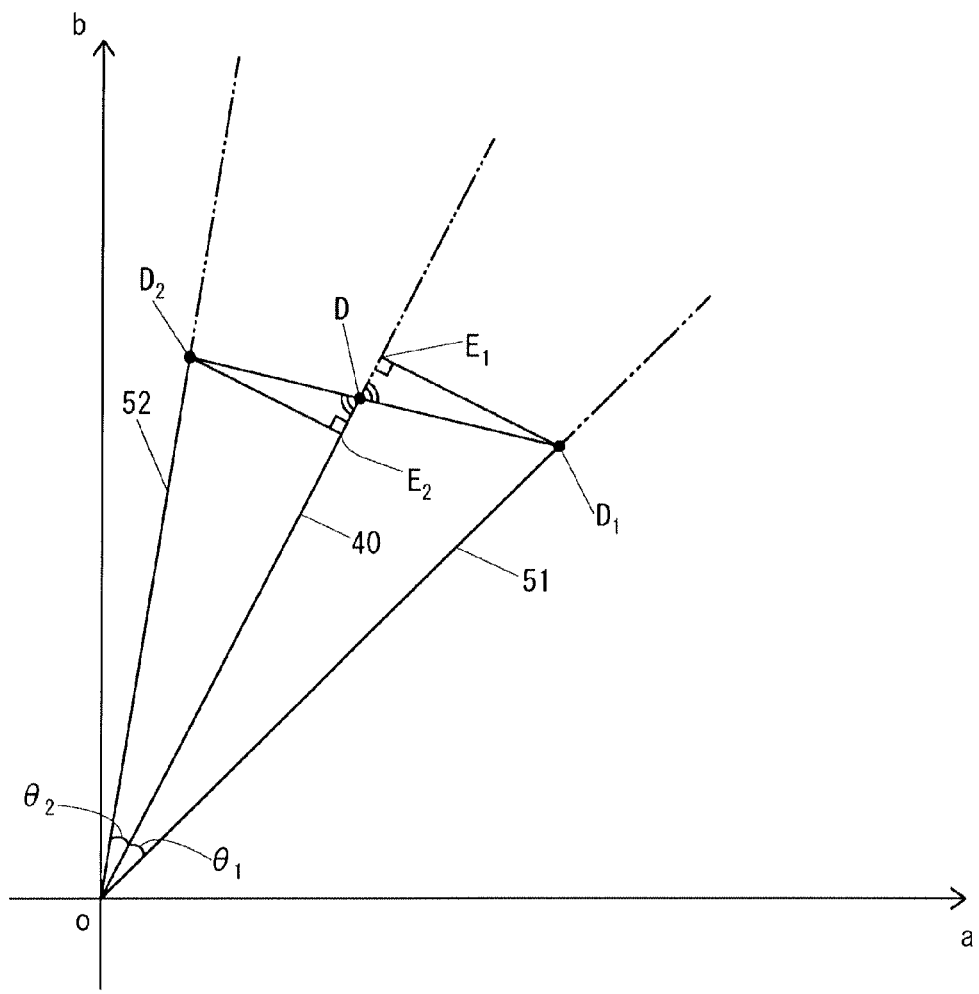
FIG. 15 shows an example of a target color hue plane in which a Lab value of a peak is determined when performing steps of the example method described with respect to FIG. 7.

FIG. 15 shows an example of a hue plane 40 in the a-b plane. A point D represents a peak of the hue plane 40. A point $D_1$ represents the peak of the side hue plane 51 and is a point in which the L-value and the C-value match the peak of the Voronoi diagram $30n_1$. A point $D_2$ represents the peak of the side hue plane 52 and is a point in which the L-value and the C-value match the peak of the Voronoi diagram $30n_2$. A point O represents a point in which the L-value and the C-value are "0". Each of points $E_1$ and $E_2$ represent a base of a perpendicular drawn from the points $D_1$ and $D_2$, respectively, to the hue plane 40. An angle $\theta_1$ represents an angle formed between the hue plane 40 and the side hue plane 51, and an angle $\theta_2$ represents an angle formed between the hue plane 40 and the side hue plane 52.

The point D represents a point that divides a line segment $D_1D_2$. Therefore, the Lab value of the point D is expressed as LabD by Equation 5.

$$LabD = \frac{LabD_1 \times DD_2 + LabD_2 \times DD_1}{DD_1 + DD_2} \quad (5)$$

In Equation 5, $LabD_1$ and $LabD_2$ represent the Lab values of the points $D_1$ and $D_2$, respectively. Further, $DD_1$ and $DD_2$ represent lengths of line segments $DD_1$ and $DD_2$, respectively.

Here, $\Delta DD_1E_1$ and $\Delta DD_2E_2$ are similar to each other. In other words, assuming that $D_1E_1$ and $D_2E_2$ are lengths of line segments $D_1E_1$ and $D_2E_2$, respectively, a relationship of $DD_1$:$DD_2$=$D_1E_1$:$D_2E_2$ is established. Therefore, Equation 5 can be rewritten as Equation 6.

$$LabD = \frac{LabD_1 \times (OD_2 \times \sin\theta_2) + LabD_2 \times (OD_1 \times \sin\theta_1)}{(OD_1 \times \sin\theta_1) + (OD_2 \times \sin\theta_2)} \quad (6)$$

In Equation 6, $OD_1$ and $OD_2$ represent lengths of line segments $OD_1$ and $OD_2$, respectively.

Here, $OD_1$, $OD_2$, $\theta_1$, and $\theta_2$ are each expressed by Equation 7.

$$OD_1 = LChD_1(C)$$

$$OD_2 = LChD_2(C)$$

$$\theta_1 = LChQ(h) - LChQ'(n_1, h)$$

$$\theta_2 = LChQ'(n_2, h) - LChQ(h) \quad (7)$$

Therefore, Equation 6 is expressed by Equation 8.

$$LabD = \frac{LabD_1 \times \left[LChD_2(C) \times \sin\left\{\begin{array}{c} LChQ'(n_2, h) - \\ LChQ(h) \end{array}\right\}\right] + LabD_2 \times \left[LChD_1(C) \times \sin\left\{\begin{array}{c} LChQ(h) - \\ LChQ'(n_1, h) \end{array}\right\}\right]}{[LChD_1(C) \times \sin\{LChQ(h) - LChQ'(n_1, h)\}] + [LChD_2(C) \times \sin\{LChQ'(n_2, h) - LChQ(h)\}]} \quad (8)$$

In Equation 7 and Equation 8, $LChD_1(C)$ and $LChD_2(C)$ are the C-values within the LCh values of the points $D_1$ and $D_2$, respectively.

Therefore, at Step S165, the color conversion unit 18c can determine LabD by using similarity interpolation, as indicated by Equation 8, based on the Lab value and the C-value of the point $D_1$, the Lab value and the C-value of the point $D_2$, the second target color hue of the hue number $n_1$ (LChQ'($n_1$, h)), and the second target color hue of the hue number $n_2$ (LChQ'($n_2$,h)).

Returning again to FIG. 7, the color conversion unit 18c continued at step S166 by determining a position of the first target color in the hue plane 40.

Figure 16:
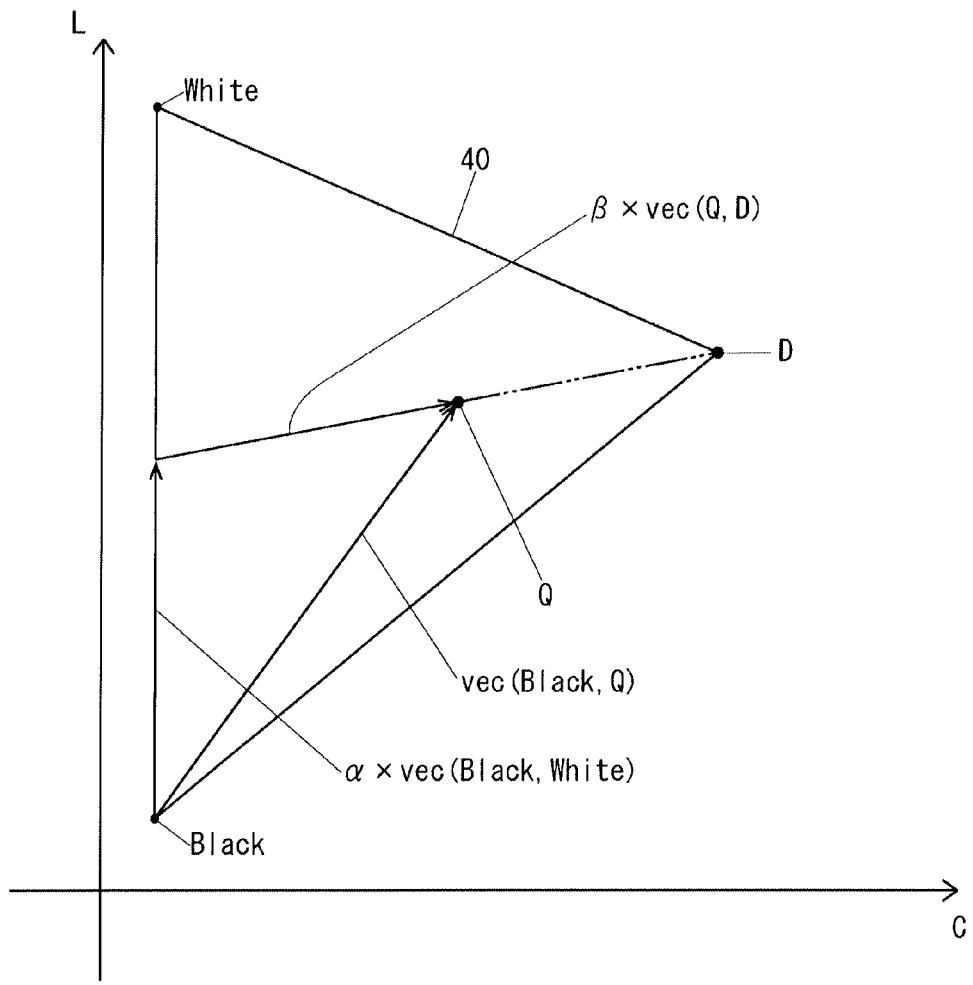
FIG. 16 shows an example of a position of a first target color in a hue plane of the first target color shown in FIG. 15.

FIG. 16 shows an example graph of the position of the first target color in the hue plane 40, with the graph showing the C-L plane. The position of the point Q in the hue plane 40, which indicates the first target color, is expressed using coefficients α and β, as defined by Equation 9.

$$vec(Black,Q) = \alpha \times vec(Black,White) + \beta \times vec(Q,D) \quad (9)$$

In Equation 9, symbol vec(Black,Q) indicates a vector on a C-L plane having the point "Black" as a start point and the point Q as an end point. Symbol vec(Black,White) indicates a vector on the LC plane having the point Black as a start point and the point "White" as an end point. Symbol vec(Q,D) indicates a vector on the C-L plane having the point Q as a start point and the point D, which indicates the peak C-value in the hue plane 40, as an end point.

At step S167, the color conversion unit 18c determines the L-value and the C-value of a color (hereinafter referred to as "second corresponding color") having the same positional relationship in a side hue plane as the first target color in the hue plane 40. In other words, the color conversion unit 18c determines the L-value and the C-value of a point $Q_1$ indicating a second corresponding color in the side hue plane 51 and the L-value and the C-value of a point $Q_2$ indicating a second corresponding color in the side hue plane 52.

Figure 17:
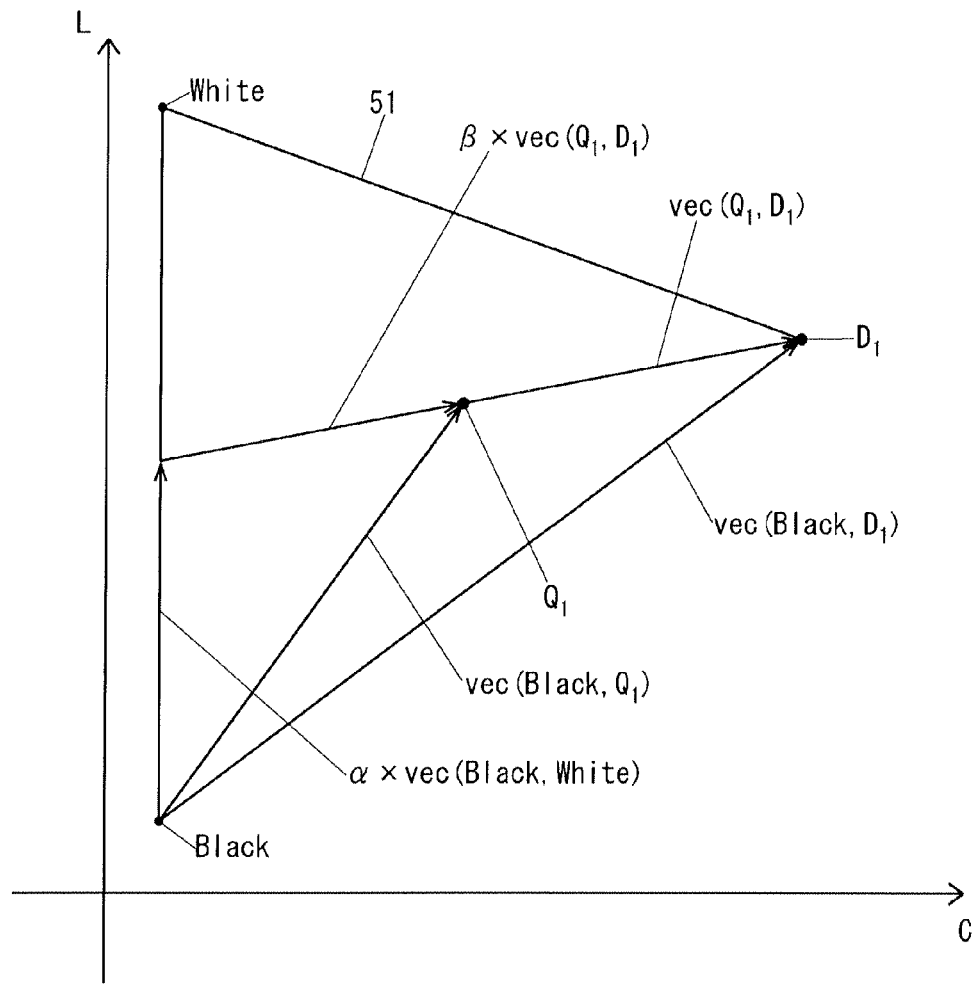
FIG. 17 shows an example of a position of a second corresponding color in a side hue plane shown in FIG. 15.

FIG. 17 is a graph showing an example of the side hue plane 51 shown in FIG. 15, again with the graph showing the C-L plane. The position of the point $Q_1$ in the side hue plane 51 is expressed using the coefficients α and β determined in Step S166, as indicated in Equation 10.

$$vec(Black,Q_1) = \alpha \times vec(Black,White) + \beta \times vec(Q_1,D_1) \quad (10)$$

In Equation 10, symbol vec(Black,$Q_1$) indicates a vector on the LC plane having the black as a start point and the point $Q_1$ as an end point. Symbol vec($Q_1$,$D_1$) indicates a vector on the C-L plane having the point $Q_1$ as a start point and the point $D_1$, which indicates the peak of the side hue plane 51, as an end point.

Here, vec($Q_1$, $D_1$) is defined by Equation 11 using vec (Black,$Q_1$) and vec(Black,$D_1$) to define a vector on the C-L plane having the point Black as a start point and the point $D_1$ as an end point. Equation 10 can be rewritten into Equation 12 based on a relationship indicated by Equation 11.

$$vec(Q_1, D_1) = -vec(\text{Black}, Q_1) + vec(\text{Black}, D_1) \tag{11}$$

$$vec(\text{Black}, Q_1) = \frac{\alpha \times vec(\text{Black}, \text{White}) + \beta \times vec(\text{Black}, D_1)}{1 + \beta} \tag{12}$$

Therefore, in Step S167, the color conversion unit 18c can determine the L-value and the C-value of the point $Q_1$ using Equation 12. The color conversion unit 18c may perform substantially the same steps to determine the L-value and the C-value of the point $Q_2$, which corresponds to the second corresponding color in the side hue plane 52.

Now at step S168, the color conversion unit 18c performs a method for acquiring a color (hereinafter referred to as "first corresponding color") whose L-value and C-value match the second corresponding color within the Voronoi diagrams 30 of the side groups, which is described now with respect to FIG. 18.

Beginning at step S261, the color conversion unit 18c may search the Voronoi diagram 30$n_1$ for a Voronoi region that includes a color whose L-value and C-value are approximately the same as the L-value and the C-value of the second corresponding color in the side hue plane 51. The color conversion unit 18c may perform this step in the same or a substantially similar manner as described with respect to step S201 in FIG. 8. Subsequently, in the same manner as in the process of Step S202, the color conversion unit 18c retrieves the Voronoi vertex closest to the second corresponding color in the identified Voronoi region at step S262.

Figure 19:
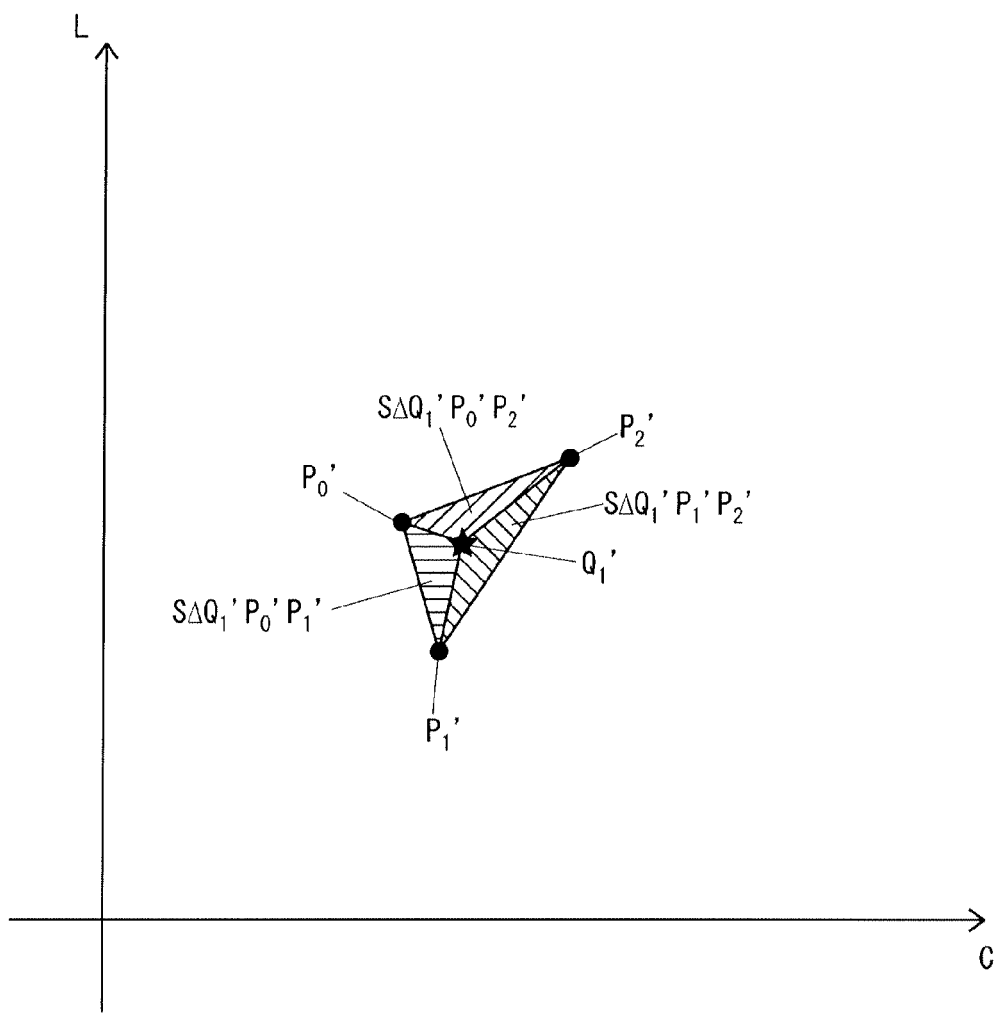
FIG. 19 shows an example of area interpolation that may be generated when performing steps of the example method described with respect to FIG. 18.

At step S263, the color conversion unit 18c searches for the generation points on the perimeter of a circle having the identified Voronoi vertex as the center. The color conversion unit 18c may perform this step in the same or a substantially similar manner as described with respect to step S203 in FIG. 8. And in the same manner as described with respect to step S204 of FIG. 8, the color conversion unit 18c determines the Lab value of the first corresponding color within the Voronoi diagram 30$n_1$ based on the identified generation points. If there are three such generation points, the Lab value may be determined using area interpolation, as expressed by Equation 13 and illustrated in FIG. 19.

$$LabQ_1' = \frac{LabP_0' \times S\Delta Q_1'P_1'P_2' + LabP_1' \times S\Delta Q_1'P_0'P_2' + LabP_2' \times S\Delta Q_1'P_0'P_1'}{S\Delta Q_1'P_1'P_2' + S\Delta Q_1'P_0'P_2' + S\Delta Q_1'P_0'P_1'} \tag{13}$$

In Equation 13, LabQ$_1$' represents the Lab value of a point $Q_1$' indicating the first corresponding color within the Voronoi diagram 30$n_1$. LabP$_0$', LabP$_1$', and LabP$_2$' represent the Lab values of the generation points P$_0$', P$_1$', and P$_2$', respectively. S$\Delta Q_1$'P$_1$'P$_2$' represents an area of a triangle formed by the point $Q_1$', a generator point P$_1$', and a generator point P$_2$'. S$\Delta Q_1$'P$_0$'P$_2$' represents an area of a triangle formed by the point $Q_1$', the generator point P$_0$', and the generator point P$_2$'.

S$\Delta Q_1$'P$_0$'P$_1$' represents an area of a triangle formed by the point $Q_1$', the generator point P$_0$', and the generator point P$_1$'.

S$\Delta Q_1$'P$_1$'P$_2$', S$\Delta Q_1$'P$_0$'P$_2$', and S$\Delta Q_1$'P$_0$'P$_1$' can be determined by an outer product of vectors. For example, S$\Delta Q_1$'P$_1$'P$_2$' may be ½ of an absolute value of the outer product of a vector having the point $Q_1$' as a start point and the generator point P$_1$' as an end point and a vector having the point $Q_1$' as a start point and the generator point P$_2$' as an end point. Note that, in order to obtain LabQ$_1$' in Equation 13, it suffices that S$\Delta Q_1$'P$_1$'P$_2$', S$\Delta Q_1$'P$_0$'P$_2$', and S$\Delta Q_1$'P$_0$'P$_1$' have a clear ratio thereamong even when respective values thereof are not accurate. The ratio among S$\Delta Q_1$'P$_1$'P$_2$', S$\Delta Q_1$'P$_0$'P$_2$', and S$\Delta Q_1$'P$_0$'P$_1$' can be determined by using an outer product of vectors based on the L-value and the C-value of the point $Q_1$', in other words, the L-value and the C-value of the second corresponding color in the side hue plane 51 generated in Step S167, and the L-values and the C-values of the respective generator points P$_0$', P$_1$', and P$_2$' retrieved in Step S263. Therefore, the color conversion unit 18c can also calculate the Lab value of the first corresponding color within the Voronoi diagram 30$n_1$ based on the Lab values, the L-values, and the C-values of the generator points P$_0$', P$_1$', and P$_p$', and the L-value and the C-value of the second corresponding color in the side hue plane 51.

At step S265, the color conversion unit 18c determines the h-value of the first corresponding color within the Voronoi diagram 30$n_1$ by using Equation 14, which is based on the a-value and the b-value within the determined Lab value.

$$LChQ_1'(h) = \tan^{-1}\left(\frac{LabQ_1'(b)}{LabQ_1'(a)}\right) \tag{14}$$

In Equation 14, LChQ$_1$'(h) represents the h-value within the LCh value of the point $Q_1$' indicating the first corresponding color within the Voronoi diagram 30$n_1$. LabQ$_1$'(a) and LabQ$_1$'(b) represent the a-value and the b-value, respectively, within LabQ$_1$'.

Now at step S266, the color conversion unit 18c determines the CMYK value (e.g., the second color system value) of the first corresponding color within the Voronoi diagram 30$n_1$ based on the three generator points retrieved in Step S263. The color conversion unit 18c may perform step S266 in the same or a substantially similar manner as described with respect to step S264. Thus, the color conversion unit 18c may use area interpolation, as expressed by Equation 15, to determine the CMYK value of the first corresponding color within the Voronoi diagram 30$n_1$.

$$CMYKQ_1' = \frac{CMYKP_0' \times S\Delta Q_1'P_1'P_2' + CMYKP_1' \times S\Delta Q_1'P_0'P_2' + CMYKP_2' \times S\Delta Q_1'P_0'P_1'}{S\Delta Q_1'P_1'P_2' + S\Delta Q_1'P_0'P_2' + S\Delta Q_1'P_0'P_1'} \tag{15}$$

In Equation 15, CMYKQ$_1$' represents the CMYK value of the point $Q_1$' indicating the first corresponding color within the Voronoi diagram 30$n_1$. CMYKP$_0$', CMYKP$_1$', and CMYKP$_2$' represent the CMYK values of the generator points P$_0$', P$_1$', and P$_2$', respectively, and may also be defined in the color conversion table 17b.

The color conversion unit 18c can calculate the CMYK value of the first corresponding color within the Voronoi diagram 30$n_1$ in Step S266 based on the CMYK values, the L-values, and the C-values of the generator points P$_0$', P$_1$', and $P_2'$, and the L-value and the C-value determined for the second corresponding color in the side hue plane 51.

The color conversion unit 18c may perform the same or substantially similar steps to determine $LChQ_2'(h)$, which indicates the h-value of the first corresponding color within the Voronoi diagram $30n_2$, and to determine $CMYKQ_2'$, which indicates the CMYK value of the first corresponding color within the Voronoi diagram $30n_2$.

Figure 18:
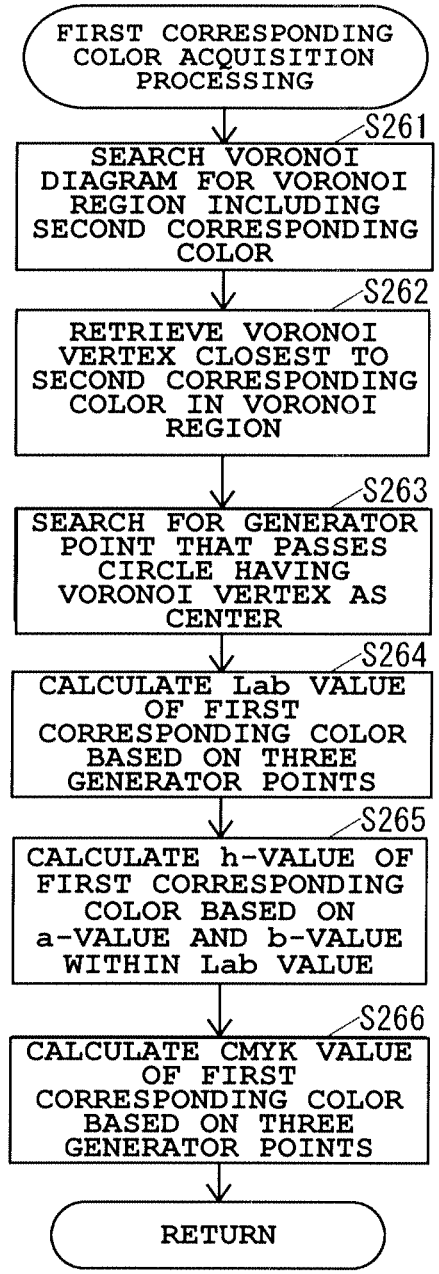
FIG. 18 is an example method for acquiring a first corresponding color when performing steps of the example method described with respect to FIG. 7.

When the process of Step S266 is finished, the color conversion unit 18c finishes the first corresponding color acquisition processing illustrated in FIG. 18.

Returning again to FIG. 7, the color conversion unit 18c determines the CMYK value of a third target color in the CMYK color system (e.g., the second color system) after the color conversion corresponding to the first target color in the RGB color system before the color conversion, at step S169.

Figure 20:
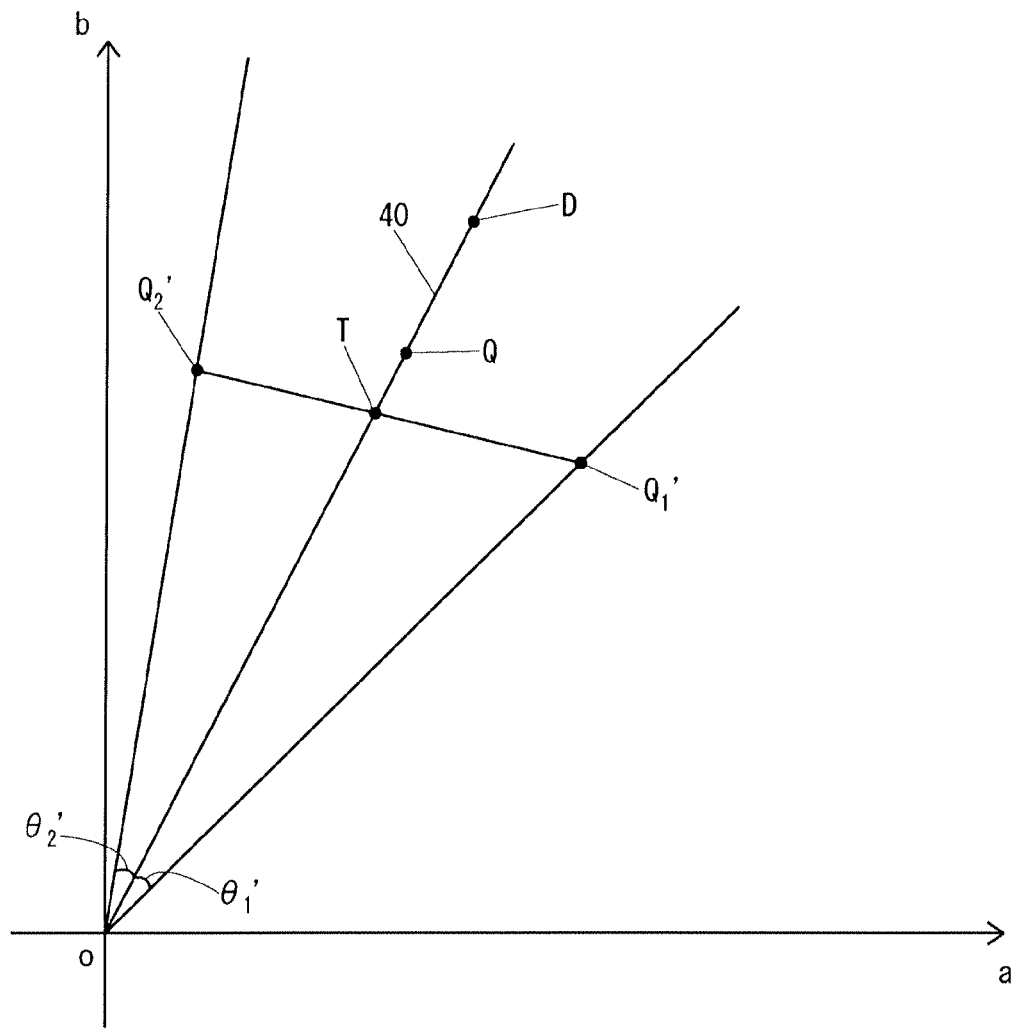
FIG. 20 shows an example graph from which a value in the second color system of a third target color may be determined when performing steps of the example method described with respect to FIG. 7.

FIG. 20 shows an example of the CMYK value of the third target color determined in the CMYK conversion process illustrated in FIG. 7. A point T represents a point indicating the CMYK value of the third target color, and is an intersection point of a line segment $Q_1'Q_2'$ and the hue plane 40 of the third target color. An angle $\theta_1'$ represents an angle formed between the hue plane 40 of the third target color and the iso-hue plane including the point $Q_1'$. An angle $\theta_2'$ represents an angle formed between the hue plane 40 of the third target color and the iso-hue plane including a point $Q_2'$.

The point T represents a point that internally divides the line segment $Q_1'Q_2'$. In a same manner as discussed with respect to Equation 8, the color conversion unit 18c can determine CMYKT, which indicates a CMYK value of the point T, using similarity interpolation, as defined by Equation 16.

$$CMYKT = \frac{CMYKQ_1' \times \left[LChQ_2'(C) \times \sin\left\{\frac{LChQ_2'(h) - }{LChQ(h)}\right\}\right] + CMYKQ_2' \times \left[LChQ_1'(C) \times \sin\left\{\frac{LChQ(h) - }{LChQ_1'(h)}\right\}\right]}{[LChQ_1'(C) \times \sin\{LChQ(h) - LChQ_1'(h)\}] + [LChQ_2'(C) \times \sin\{LChQ_2'(h) - LChQ(h)\}]} \quad (16)$$

In Equation 16, $CMYKQ_1'$, $CMYKQ_2'$, $LChQ_1'(h)$, and $LChQ_2'(h)$ determined in the process of Step S168 are used. Further, $LChQ_1'(C)$ is the C-value of the first corresponding color within the Voronoi diagram $30n_1$ that is the same as the C-value of the point $Q_1$. In the same manner, $LChQ_2'(C)$ is the C-value of the first corresponding color within the Voronoi diagram $30n_2$ that is the same as the C-value of the point $Q_2$.

When the process of Step S169 is finished, the color conversion unit 18c finishes the CMYK conversion processing illustrated in FIG. 7.

Now turning back to FIG. 6, when the process of repetition in Step S131 is finished, the control unit 18 outputs an image based on the image data in which the colors of all the pixels have been converted from the RGB values into the CMYK values at step S134, thereby finishing the method described with respect to FIG. 6.

Note that, a method of outputting the image is, for example, printing performed by the printer 14.

In line with the above discussion, the MFP 10 converts a target color from a color (e.g., a first target color) in the RGB color system (e.g., a first color system) into a color (e.g., a third target color) in the CMYK color system (e.g., a second color system) by using the color conversion table 17b. As described, the color conversion table 17b may define a correspondence or a relationship between a plurality of colors in the RGB color system and a plurality of colors in the CMYK color system. Specifically, the MFP 10 may acquire the hue of a second target color, e.g., the second target color hue, having the same lightness and the same chroma as the first target color within each of the one or more Voronoi diagrams 30. Each Voronoi diagram includes one or more generation points defined by the predefined colors included in the color conversion table 17b. Further, the MFP 10 acquires the side groups, which are the two groups in the plurality of groups located on either side of the first target color in terms of the hue, based on the hue of the first target color and the second target color hue. Then, the MFP 10 may further acquire the third target color by converting the first target color from the color in the RGB color system into the color in the CMYK color system based on the predefined colors corresponding to the side groups and the first target color.

Note that, in this embodiment, the MFP 10 uses the color conversion table 17b in which the predefined colors are arranged in the RGB color system at regular intervals. Alternatively, the MFP 10 may use a color conversion table in which the predefined colors are arranged in the RGB color system at irregular intervals. When using such a color conversion table 17b, the MFP 10 may convert with high accuracy the first target color to the third target color within a range in which the predefined colors included in the color conversion table are arranged at narrow intervals in the RGB color system. At the same time, the MFP 10 may provide a range in which the predefined colors within the color conversion table 17b are arranged at wide intervals in the RGB color system, thereby minimizing the amount of data within the range used to store the color conversion table and, for example, reduce a storage size of the storage unit 17.

The MFP 10 may acquire the hue of the second target color based on a plurality of generator points close to a Voronoi vertex, such that each second target color has a lightness and a chroma close to that of the first target color. With this configuration, the MFP 10 can acquire the hue of the second target color by using the Voronoi diagram 30. In other words, the MFP 10 can acquire the predefined color around the first target color among the predefined colors defined in a color conversion table by using the Voronoi diagram 30. Therefore, the MFP 10 can convert the target color from the first target color in the RGB color system into the third target color in the CMYK color system.

Further, the MFP 10 acquires the first corresponding color corresponding to the first target color as the color in the CMYK color system based on the predefined color within the Voronoi diagram 30 of each of the side groups acquired in Step S164 (S168), and acquires the third target color expressed by using the CMYK color system based on the first corresponding color acquired as the color in the CMYK color system for each of the side groups (S169). Then, the MFP 10 may acquire the first corresponding color as a color in the CMYK color system based on: a second corresponding color having the same positional relationship as the first target color in an iso-hue plane of the hue of the first target color, in other words, e.g., the hue plane 40, in the iso-hue planes of the hues of the second target colors of the side groups, e.g., the side hue planes 51 and 52; and the plurality of generator points closest to the Voronoi vertex having a lightness and chroma closest to that of the second corresponding color within the Voronoi diagrams 30 of the side groups. With this configuration, the MFP 10 can acquire the first corresponding color of each of the side groups as the color in the CMYK color system by making the most of the characteristic of the Voronoi diagram 30. In other words, the MFP 10 can acquire the predefined color around the first target color among the predefined colors defined in the color conversion table by making the most of the characteristic of the Voronoi diagram 30. Therefore, the MFP 10 can convert the target color from the first target color to the third target color at high speed.

Note that, in this embodiment, the color system of the color of the image input to the MFP 10 is the RGB color system, and the color system of the color of the image converted by the MFP 10 and output therefrom is the CMYK color system, but the color system of the color of the image input to the MFP 10 or the color system of the color of the image converted by the MFP 10 and output therefrom is not limited thereto.

Further, the MFP is employed as a color conversion device according to the embodiment of the present disclosure, but an image forming apparatus other than the MFP such as a copying machine and a printer may be employed, and a computer other than the image forming apparatus such as a general-purpose personal computer may be employed.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A color conversion device, comprising:
    a control unit configured to execute a color conversion program stored on a non-transitory computer-readable recording medium, the control unit comprising:
        a hue acquisition unit that acquires a hue of a plurality of second target colors, each second target color having an approximately same lightness and an approximately same chroma as a first target color within each of one or more Voronoi diagrams, wherein each generation point of each Voronoi diagram corresponds to one of a plurality of predefined colors included in a color conversion table, wherein the color conversion table defines a correspondence between a plurality of colors in a first color system and a plurality of colors in a second color system, wherein each Voronoi diagram corresponds to a plurality of groups into which a plurality of predefined colors are classified according to respective ranges of a series of hues;
        a side group acquisition unit that acquires two side groups based on a hue of the first target color and the hue of the second target color, wherein each side group is included in the plurality of groups and is located on either side of the first target color in terms of the hue; and
        a color conversion unit that acquires a third target color by converting the first target color to a color in the second color system based on the predefined colors corresponding to the side groups and the first target color.

2. The color conversion device according to claim 1, wherein, for each of the one or more Voronoi diagrams, the hue acquisition unit determines the hue of the second target color based on a plurality of generation points closest to a Voronoi vertex, wherein the Voronoi vertex corresponds to a point having a lightness and a chroma that are closest to a lightness and a chroma of at least one of (i) the first target color within the Voronoi diagram or (ii) the first target color.

3. The color conversion device according to claim 1, wherein, based on the predefined color within the Voronoi diagram of each of the side groups acquired by the side group acquisition unit, the color conversion unit determines a first corresponding color that corresponds to the first target color, wherein the first corresponding color is a color in the second color system after the conversion, and
    wherein the side group acquisition unit determines the third target color based on the first corresponding color acquired for each of the side groups.

4. The color conversion device according to claim 3, wherein the color conversion unit acquires the first corresponding color as the color in the color system after the conversion based on: a second corresponding color having the same positional relationship as the first target color in an iso-hue plane of the hue of the first target color in iso-hue planes of the hues of the second target colors of the side groups; and a plurality of the generator points closest to a Voronoi vertex having lightness and chroma closest to the second corresponding color within the Voronoi diagrams of the side groups.

5. A color conversion method, comprising:
    acquiring, via a hue acquisition unit, a hue of a second target color having the same lightness and the same chroma as a first target color within Voronoi diagrams in which predefined colors defined in a color conversion table that defines a correspondence relationship between a color in a color system before conversion and a color in a color system after the conversion are set as generator points, the Voronoi diagrams being provided respectively to a plurality of groups into which the predefined colors are classified for respective ranges of a series of hues;
    acquiring, via a side group acquisition unit, side groups that are two groups located on both sides of the first target color in terms of the hue among the plurality of groups, based on a hue of the first target color and the hue of the second target color; and
    acquiring, via a color conversion unit, a third target color by converting the first target color from the color in the color system before the conversion into the color in the color system after the conversion based on the predefined colors of the side groups acquired via the side group acquisition unit and the first target color.

6. The color conversion method according to claim 5, further comprising acquiring, via the hue acquisition unit, the hue of the second target color based on a plurality of the generator points closest to a Voronoi vertex having lightness and chroma closest to the first target color within the Voronoi diagram and the first target color.

7. The color conversion method according to claim 5, further comprising acquiring, via the color conversion unit, a first corresponding color corresponding to the first target color as the color in the color system after the conversion based on the predefined color within the Voronoi diagram of each of the side groups acquired via the side group acquisition unit, and acquiring the third target color based on the first corresponding color acquired for each of the side groups.

8. The color conversion method according to claim 7, further comprising acquiring, via the color conversion unit, the first corresponding color as the color in the color system after the conversion based on: a second corresponding color having the same positional relationship as the first target color in an iso-hue plane of the hue of the first target color in iso-hue planes of the hues of the second target colors of the side groups; and a plurality of the generator points closest to a Voronoi vertex having lightness and chroma closest to the second corresponding color within the Voronoi diagrams of the side groups.

9. A non-transitory computer-readable recording medium having stored a color conversion program executable by a computer, the color conversion program comprising:
- a first program code for causing the computer to acquire a hue of a second target color having the same lightness and the same chroma as a first target color within Voronoi diagrams in which predefined colors defined in a color conversion table that defines a correspondence relationship between a color in a color system before conversion and a color in a color system after the conversion are set as generator points, the Voronoi diagrams being provided respectively to a plurality of groups into which the predefined colors are classified for respective ranges of a series of hues;
- a second program code for causing the computer to acquire side groups that are two groups located on both sides of the first target color in terms of the hue among the plurality of groups, based on a hue of the first target color and the hue of the second target color; and
- a third program code for causing the computer to acquire a third target color by converting the first target color from the color in the color system before the conversion into the color in the color system after the conversion based on the predefined colors of the side groups acquired by the second program code and the first target color.

10. The non-transitory computer-readable recording medium according to claim 9, wherein the first program code further causes the computer to acquire the hue of the second target color based on a plurality of the generator points closest to a Voronoi vertex having lightness and chroma closest to the first target color within the Voronoi diagram and the first target color.

11. The non-transitory computer-readable recording medium according to claim 9, wherein the third program code further causes the computer to acquire a first corresponding color corresponding to the first target color as the color in the color system after the conversion based on the predefined color within the Voronoi diagram of each of the side groups acquired by the second program code, and acquire the third target color based on the first corresponding color acquired for each of the side groups.

12. The non-transitory computer-readable recording medium according to claim 11, wherein the third program code further causes the computer to acquire the first corresponding color as the color in the color system after the conversion based on: a second corresponding color having the same positional relationship as the first target color in an iso-hue plane of the hue of the first target color in iso-hue planes of the hues of the second target colors of the side groups; and a plurality of the generator points closest to a Voronoi vertex having lightness and chroma closest to the second corresponding color within the Voronoi diagrams of the side groups.

* * * * *